United States Patent [19]

Kawai et al.

[11] Patent Number: 4,663,369
[45] Date of Patent: May 5, 1987

[54] GLASS-FIBER REINFORCED POLYPROPYLENE RESIN COMPOSITION

[75] Inventors: Yoichi Kawai; Masaru Abe; Masami Maki; Koutarou Suzuki; Minoru Hoshino, all of Kanagawa, Japan

[73] Assignee: Mitsui Toatsu Chemicals, Inc., Tokyo, Japan

[21] Appl. No.: 870,049

[22] Filed: Jun. 3, 1986

[30] Foreign Application Priority Data

Jun. 3, 1985 [JP] Japan .................................. 60-118716

[51] Int. Cl.[4] .......................... C08K 7/14; C08K 3/40; C08K 9/06
[52] U.S. Cl. ..................................... 523/203; 523/200; 523/206; 523/214; 524/394; 524/504
[58] Field of Search ............... 523/200, 203, 206, 214; 524/394, 504

[56] References Cited

U.S. PATENT DOCUMENTS

| | | | |
|---|---|---|---|
| 3,966,672 | 6/1976 | Gaylord | 523/205 |
| 4,082,720 | 4/1978 | Henman | 523/213 |
| 4,278,586 | 7/1981 | Marzola et al. | 524/290 |
| 4,370,450 | 1/1983 | Grigo et al. | 524/547 |
| 4,472,539 | 9/1984 | Funakoshi et al. | 523/214 |
| 4,603,153 | 7/1986 | Sobajima et al. | 523/200 |

*Primary Examiner*—Herbert J. Lilling
*Attorney, Agent, or Firm*—Sughrue, Mion, Zinn, Macpeak and Seas

[57] ABSTRACT

A glass-fiber reinforced polypropylene composition having superior adhesion of glass fibers therein, stiffness, high-impact properties and molding properties is provided, which composition comprises a graft polypropylene resin obtained by graft-polymerizing a radically polymerizable unsaturated compound onto a crystalline polypropylene resin with an organic peroxide catalyst in a hydrocarbon solvent or a blend of the graft polypropylene with a crystalline polypropylene resin, glass fibers treated with an organic silane or titanium compound, Ca stearate and an alkaline earth metal compound, the respective quantities of the above components being specified.

17 Claims, No Drawings

GLASS-FIBER REINFORCED POLYPROPYLENE RESIN COMPOSITION

BACKGROUND OF THE INVENTION

1. Field of the Invention

This invention relates to a glass-fiber reinforced polypropylene resin composition having high stiffness, superior high-impact properties and high molding fluidity.

2. Related Art Statement

Glass-fiber reinforced polypropylene resins have superior stiffness, heat resistance, etc. to those of usual polypropylene resins; hence they have so far been broadly used for various industrial parts including automobile parts, electrical parts, etc.

However, in order to produce glass-fiber reinforced polypropylene resin compositions, even if crystalline polypropylene and glass fibers are merely melt-kneaded together, no sufficient reinforcement is effected since adhesion of polypropylene resin to glass fibers is weak due to non-polarity of polypropylene. Further, when glass fibers are added to polypropylene resin and the latter is melted, its fluidity generally lowers, and it is the present status that particularly when the blend is molded into a large size of molded products, such molding is often restricted in the aspect of molding machine, molding conditions, mold design, etc.

As processes for improving the adhesion between polypropylene resin and glass fibers, various processes have been proposed such as a process of adding surface-treated glass fibers to a polypropylene modified with a carboxylic acid, a carboxylic acid anhydride or an unsaturated carboxylic acid (Japanese patent publication No. Sho 49-49029/1974 USP 4003874), a process of blending glass fibers and a modified polypropylene modified with an unsaturated carboxylic acid according to solution method, with a polypropylene resin (Japanese patent publication No. Sho 54-44696/1979), etc. However, any of these processes have been confirmed to have an effectiveness of improving the stiffness and high-impact properties, but they are insufficient to satisfy well-balanced mechanical physical properties required by the current market.

Further, in addition to the above processes, a composition having an improved molding fluidity has been proposed (Japanese patent application laid-open No. Sho 57-182343/1982), but this is also not practical since the kind of polypropylene resins used is limited.

Besides, a process of melt-kneading a polyolefin, glass fibers, an unsaturated silane compound, an organic carboxylic acid and a radical-generating agent has also been proposed, but although the composition obtained according to such a process is advantageous in the aspect of cost, the composition has coloring and odor and also is low in the effectiveness of improving the stiffness and high-impact properties.

SUMMARY OF THE INVENTION

The present inventors have made extensive research in order to obtain a glass-fiber reinforced polypropylene resin composition having solved the above-mentioned problems, and have achieved the present invention.

The present invention resides in a glass-fiber reinforced polypropylene resin composition comprising 95 to 55 parts by weight of a modified polypropylene resin as a graft polypropylene resin obtained by graft-polymerizing a radically polymerizable unsaturated compound onto a crystalline polypropylene resin with an organic peroxide catalyst in a hydrocarbon solvent, or a blend of said graft polypropylene resin with a crystalline polypropylene resin, and 5 to 45 parts by weight of glass fibers treated with an organic silane compound or an organic titanium compound, the total weight of said modified polypropylene resin and said glass fibers being 100 parts by weight, and further 0.005 to 0.05 part by weight of calcium stearate and 0.01 to 0.07 part by weight of at least one member selected from the group consisting of alkaline earth metal oxides, hydroxides, basic salts and basic complex salts.

DETAILED DESCRIPTION OF PREFERRED EMBODIMENTS

Crystalline polypropylene resins used in the present invention refer to propylene homopolymer, copolymers of propylene with other α-olefins such as ethylene, butene, etc. and the like, and any of those having crystallinity may be used. Further, those used in the graft polymerization may be the same as or different from those blended with the graft polymer.

As the graft polypropylene resin used in the present invention, the above graft polypropylene resin obtained by graft-polymerizing a radically polymerizable unsaturated compound onto the crystalline polypropylene resin with an organic peroxide catalyst in a hydrocarbon solvent is suitable. In addition, in the case of graft polypropylene resins obtained according to other processes e.g. a process of mixing an organic peroxide, etc. with a crystalline polypropylene resin and a radically polymerizable unsaturated compound, followed by heat-treating the mixture by means of an extruder, a Banbury mixer, or the like, the radically polymerizable compound remains in a large quantity, whereby the resulting composition is not only colored, but also the effectiveness of improving the stiffness and high-impact properties is poor.

Next, preparation of the graft polyolefin resin will be first described.

Examples of the hydrocarbon solvent used herein are aromatic hydrocarbons, alkylaromatic hydrocarbons, halogenated aromatic hydrocarbons, aliphatic hydrocarbons, alicyclic hydrocarbons, halogenated aliphatic hydrocarbons, etc. such as benzene, toluene, xylene, mixed xylenes, trimethylbenzenes, tetramethylbenzenes, ethylbenzene, cumene, cymene, chlorobenzene, dichlorobenzene, bromobenzene, pentane, hexane, heptane, octane, cyclohexane, chloroform, carbon tetrachloride, chloroethane, 1,1-dichloroethane, 1,1,2,2-tetrachloroethane, 1,1-dibromoethane, 1,2-dibromoethane, 1,1,2,2-tetrabromoethane, etc. These are used alone or in admixture of two or more kinds.

The quantity of the solvent used varies depending on the kind of the solvent used, the polymerization degree of the crystalline polypropylene used and the kind and quantity of the radically polymerizable unsaturated compound to be grafted, but usually the quantity is preferred to be in the range of 5 to 50% by weight, preferably 8 to 20% by weight in the reaction mixture solution.

As the organic peroxide used in the graft polymerization, any of those which are used in usual radical polymerization may be used. Examples of the peroxide are t-butyl peroxide, lauroyl peroxide, benzoyl peroxide, cyclohexanone peroxide, t-butylperoxyisopropyl carbonate, t-butylperoxybenzoate, methyl ethyl ketone peroxide, dicumyl peroxide, 2,5-dimethyl-2,5-di(t-butylperoxy)hexane, di-t-butyl peroxide, 2,5-dimethyl-2,5-di(t-butylperoxy)hexine-3, etc. These may be used in admixture of two or more kinds.

The quantity of the organic peroxide charged has no particular limitation, but in general, it is suitable to be in the range of 0.01 to 100 parts by weight based on 100 parts by weight of the crystalline polypropylene resin.

The reaction temperature in the graft polymerization may be the dissolution temperature of the crystalline polypropylene resin or higher and usually it is 110° C. or higher. The reaction time has no particular limitation, but usually a range of 0.5 to 20 hours may be sufficient.

Further, examples of the radically polymerizable unsaturated compound are $\alpha,\beta$-unsaturated aliphatic monocarboxylic acids and derivatives thereof, $\alpha,\beta$-unsaturated aliphatic dicarboxylic acids and derivatives thereof, alkenylbenzenes and derivatives thereof, alkenylpyridines and derivatives thereof, $\alpha$-olefins, etc. These may be used alone or in admixture of two or more kinds. Concrete examples of the compound are acrylic acid, methacrylic acid, cinnamic acid, methyl acrylate, methyl methacrylate, methyl cinnamate, 2-hydroxylethyl methacrylate, 2-hydroxyethyl acrylate, glycidyl acrylate, glycidyl methacrylate, acrylamide, methacrylamide, N,N-dimethylacrylamide, N,N-dimethylmethacrylamide, acrylonitrile, methacrylonitrile, vinylidene cyanide, vinyl formate, vinyl chloroacetate, allyl acetate, vinyl trifluoroacetate, vinyl benzoate, maleic acid, fumaric acid, itaconic acid, maleic anhydride, itaconic anhydride, monoethyl maleate ester, diethyl maleate ester, monomethyl fumarate ester, dimethyl fumarate ester, mono-n-butyl itaconate, di-n-butyl itaconate ester, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide, maleimide, N-butylmaleimide, N-phenylmaleimide, styrene, $\alpha$-methylstyrene, trichlorostyrene, 2-vinylpyridine, 4-vinylpyridine, N-vinylcarbazole, vinyl isocyanate, vinyl sulfonate and its sodium salt, $\alpha$-methylvinyl sulfonate, vinyl chloride, vinyl bromide, vinylidene chloride, vinyltrimethylsilane, allyltrimethylsilane, vinyltrichlorosilane, allyltrichlorosilane, ethylene, propylene, etc.

The quantity of these radically polymerizable unsaturated compounds used has no particular limitation, but usually it is in the range of 0.01 to 100 parts by weight based on 100 parts by weight of the crystalline polypropylene resin.

The graft polypropylene resin as obtained above may be used as it is, but in the aspect of cost it is preferred to prepare a graft polypropylene resin having a high percentage grafting of the radically polymerizable unsaturated compound and blend this resin with a crystalline polypropylene resin. The blending proportion varies depending on the percentage grafting of the graft polypropylene resin, but it is preferred to add the former graft polypropylene resin so that the quantity of the radically polymerizable unsaturated compound can fall within a range of 0.005 to 3.0 parts by weight, preferably 0.05 to 2.0 parts by weight, based on 100 parts by weight of the glass fibers in the glass-fiber reinforced polypropylene resin composition of the present invention. The graft polypropylene resin and the resin blend of the graft polypropylene resin with the crystalline polypropylene resin will hereinafter be collectively referred to as modified polypropylene resin. If the quantity of the radically polymerizable unsaturated compound added is less than 0.005 part by weight, the adhesion between the glass fibers and the modified polypropylene resin lowers, and the effectiveness of improving the stiffness and high-impact properties of the resulting resin composition is poor, while even if it exceeds 3.0 parts by weight, the stiffness and high-impact properties lower contrarily, and also the cost becomes high; thus either cases are undesired.

As to the glass fibers used in the present invention, treatment thereof with an organic silane compound or an organic titanium compound is necessary for improving dispersion of the fibers in the resin. Examples of such an organic silane compound used for the treatment are vinyltrichlorosilane, vinyltris($\beta$-methoxyethoxy)silane, vinyltriethoxysilane, $\gamma$-methacryloxypropyltrimethoxysilane, $\beta$-(3,4-epoxycyclohexyl)ethyltrimethoxysilane, $\gamma$-glycidoxypropyltrimethoxysilane, N-($\beta$-aminoethyl)-$\gamma$-aminopropyltrimethoxysilane, N-($\beta$-aminoethyl)-$\gamma$-aminopropylmethyldimethoxysilane, $\gamma$-aminopropyltriethoxysilane, N-phenyl-$\gamma$-aminopropyltrimethoxysilane, $\gamma$-methylcaptopropyltrimethoxysilane, $\gamma$-chloropropyltrimethoxysilane, etc.

Further, examples of the organic titanium compound are isopropyltriisostearoyl titanate, isopropyltridodecylbenzenesulfonyl titanate, isopropyltris(dioctylpyrophosphate)titanate, tetraisopropylbis(dioctylphosphite)titanate, tetraoctylbis(ditridecylphosphite)titanate, tetra(2,2-diallyloxymethyl-1-butyl)bis(ditridecylphosphite)titanate, bis(dioctylpyrophosphate)oxyacetatetitanate, bis(dioctylpyrophosphate)ethylenetitanate, etc. In addition, many of these organic titanium compounds are colored to thereby color the resulting treated glass fibers; hence, it is preferred to treat glass fibers with an organic silane compound.

Treatment of glass fibers with an organic silane compound or an organic titanium compound may be often carried out by contacting glass fibers with at least one kind of the organic silane compound or organic titanium compound. The quantity thereof used is preferred to be usually about 0.01 to 0.1 part by weight based on 100 parts by weight of glass fibers. Further, as the glass fibers, usually those having a diameter of single fiber of 1 to 15 $\mu$m and a length of 1 to 100 mm may be used.

As to the blending proportions of the modified polypropylene resin and glass fibers, the proportion of the modified polypropylene resin is in the range of 95 to 55 parts by weight, preferably 95 to 60 parts by weight, and that of glass fibers is in the range of 5 to 45 parts by weight, preferably 5 to 40 parts by weight, each based on 100 parts by weight as the total weight of the resin and the glass fibers. If the quantity of glass fibers blended is less than 5 parts by weight, the effectiveness of improving the stiffness of the resin composition of the present invention is poor, while if it exceeds 45 parts by weight, the fluidity of the resulting composition lowers and also the moldability lowers. Further, the high-impact properties and particularly DuPont high-impact strength also lower; hence either cases are undesirable.

The quantity of calcium stearate used in the present invention has a very important meaning. Calcium stearate has so far been added as a neutralizing agent for the catalyst residue in polypropylene resins, but if its quantity added exceeds 0.05 part by weight based on 100 parts by weight as the total weight of the modified polypropylene resin and glass fibers, defined in the present invention, the adhesion between the modified propylene resin and glass fibers lowers extremely; hence the stiffness and high-impact properties of the resulting resin composition not only lower, but also particularly when the composition is pelletized, glass fibers fluff out of the surface of pellets so that practically serious problem is raised. Further if the quantity added is less than 0.005 part by weight, neutralization of the catalyst residue is not sufficiently carried out; hence when the pellets are molded into product, hydrochloric acid gas evolves to corrode the mold. Further, dispersion of glass fibers also lower. In addition, the preferable quantity of calcium stearate added is in the range of 0.01 to 0.05 part by weight.

In the present invention, alkaline earth metal oxides, hydroxides, basic salts or basic complex salts are used.

Preferable examples of alkaline earth metal oxides or hydroxides are magnesium oxide, magnesium hydroxide, calcium oxide and calcium hydroxide. Examples of the basic salts are those obtained by partly neutralizing the above oxides or hydroxides, such as basic magnesium carbonate, basic calcium carbonate, etc.

Examples of alkaline earth metal basic complex salts are hydrotalcite group represented by hydrotalcite which is a hydrous basic carbonate mineral.

These will hereinafter be collectively referred to as alkaline earth metal compounds.

Alkaline earth metal compounds are used alone or in admixture of two kinds or more. Preferable examples thereof are magnesium oxide, magnesium hydroxide, calcium hydroxide, basic magnesium carbonate, hydrotalcite, etc.

The quantity of alkaline earth metal compounds used is in the range of 0.01 to 0.07 part by weight based on 100 parts by weight as the total weight of the modified polypropylene resin and glass fibers. If it is less than 0.01 part by weight, neutralization of the catalyst residue is not sufficiently carried out and when molding into product is carried out, hydrochloric acid evolves to corrode the mold, while even if it exceeds 0.07 part by weight, the effectiveness is unchanged from the case of less quantity and the weather resistance often becomes inferior.

Further, beside the above components, antioxidant, heat stabilizer, UV absorber, antistatic agent, nucleus-forming agent, organic or inorganic pigment and various organic or inorganic filler may be added as far as the effectiveness of the present invention is not notably damaged.

The composition of the present invention is obtained by adding calcium stearate, an alkaline earth compound and if necessary, various additives, to a modified polypropylene and glass fibers, blending the mixture by means of a known mixer such as Henschel mixer, ribbon blender or the like and extruding and pelletizing the blend by means of an extruder.

In addition, when the composition of the present invention is pelletized, it is possible to obtain a composition having a better fluidity, by adding an organic peroxide used in the above graft polymerization to the composition in advance. Further, the heat treatment may be carried out separately from the time of the pelletization.

When such a heat treatment is carried out, the quantity of an organic peroxide added is suitable to be in the range of 0.001 to 0.5 part by weight based on 100 parts by weight as the total weight of the modified polypropylene resin and glass fibers. If it is less than 0.001 part by weight, the effectiveness of improving the fluidity of the resulting composition is poor and its moldability is also inferior and further, the balance between the stiffness and the high-impact properties is inferior, while if it exceeds 0.5 part by weight, the fluidity of the composition contrarily increases too much and also the high-impact properties lower; hence such cases outside the range are practically undesirable.

As to the process of this heat treatment, there is a process of mixing definite quantities of a modified polypropylene resin, glass fibers, an organic peroxide, calcium stearate and an alkaline earth metal compound and carry out the heat treatment by means of Banbury mixer, heating roll or the like, but usually the heat treatment is very often carried out when the mixture is melt-kneaded and pelletized. Further, there is also a process of mixing components excluding glass fibers, followed by feeding the mixture into an extruder and adding glass fibers alone through a vent hole of the extruder by means of a metering feeder. This process is preferred in the aspect of working properties, etc. The extruder and the shape of the screw used in this process have no particular limitation. Usually, in the case of single screw extruder, full-flighted screw is preferred, while in the case of twin-screw extruder, a type of screw by which break of glass fibers is few is often used.

The temperature of extruder in such a case depends on the kind of the modified polypropylene resin used, and the kind of organic peroxide and its quantity used, but usually the temperature is suitable to be in the range of 170° to 280° C. If it is lower than 170° C., the heat treatment of the composition is not sufficiently carried out, while even if the heat treatment is carried out at temperatures exceeding 280° C., its effectiveness is not observed so much, and contrarily there is a fear that the composition is thermally decomposed; thus either cases are undesirable.

Using the thus obtained pellets, various molded products can be produced according to injection molding process, extrusion molding process, compression molding process or the like.

The glass-fiber reinforced polypropylene resin composition according to the present invention is superior in stiffness, high-impact properties and molding fluidity; hence it is suitable to industrial parts such as automobile parts, electrical parts, and particularly to cooling fan, pulley, etc. of automobile engine.

The present invention will be described in more detail by way of Examples and Comparative examples.

In addition, melt flow index (MI), tensile strength, flexural strength, flexural modulus and Izod impact strength described therein were measured according to ASTM D-1238 (load 2.16 Kg, 230° C.), ASTM D-638, ASTM D-790, ASTM D-790 and ASTM D-256, respectively.

EXAMPLE 1

A crystalline polypropylene resin (a polypropylene homopolymer having a MI of 8) (350 g) and chlorobenzene (3,500 ml) were fed into a 5 l autoclave and the temperature was raised up to 130° C. with stirring, followed by introducing a solution of di-t-butyl peroxide (35 g) dissolved in chlorobenzene (140 ml) and a solution of maleic anhydride (50 g) dissolved in acetone (80 ml) over 4 hours, and thereafter continuing agitation at 130° C. for 3 hours to complete the reaction. The reaction was carried out in nitrogen atmosphere.

After cooling, the resulting slurry was washed with a large quantity of acetone, filtered and dried to obtain a graft polypropylene resin (GPP-A). The percentage grafting of the maleic anhydride of this resin was 11.5% by weight according to IR measurement.

An ethylene-propylene block copolymer (PP-A) (ethylene content: 18.5% by weight, MI: 0.8 g/10 min, and boiling n-heptane insoluble: 91.5% by weight) (79 parts by weight), GPP-A (one part by weight), glass fibers (GF-A) (single fiber diameter: 9 μm and length: 3 mm) treated with γ-aminopropyltriethoxysilane (0.05% by weight based on glass fibers) (20 parts by weight), 2,5-dimethyl-2,5-di(t-butylperoxy)hexane (0.1 part by weight), calcium stearate (0.02 part by weight), calcium hydroxide (0.03 part by weight), 2,6-di-t-butyl-p-methylphenol (0.05 part by weight), tetraxis[methylene-3-(3,5-di-t-butyl-4-hydroxyphenyl)propionate]methane (0.1 part by weight) and distearylthiodipropionate (0.3 part by weight) were mixed in a Henschel mixer and pelletized by means of a single screw extruder (40 mmφ) having a full flighted screw.

The resulting pellets were molded into definite test pieces by means of an injection molding machine and various physical properties thereof were measured. The results are shown in Table 1.

EXAMPLES 2 AND 3 AND COMPARATIVE EXAMPLE 1

Tests were carried out in the same manner as in Example 1 except that the quantities of PP-A and GPP-A used were varied as shown in Table 1. The results are shown in Table 1.

EXAMPLE 4

Test was carried out in the same manner as in Example 1 except that no organic peroxide was added. The results are shown in Table 1.

Molding was difficult due to small MI, but other physical properties were good.

EXAMPLE 5

Test was carried out in the same manner as in Example 1 except that PP-A was replaced by an ethylenepropylene block copolymer (PP-B) (ethylene content: 6.7% by weight, MI: 3.3 g/10 min and boiling n-heptane insoluble: 93.2% by weight) and the quantity of the organic peroxide added was 0.07 part by weight. The results are shown in Table 1.

EXAMPLE 6

Test was carried out in the same manner as in Example 5 except that PP-B was replaced by a propylene homopolymer (MI: 1.5 g/10 min and boiling n-heptane insoluble: 96.5% by weight) (PP-C). The results are shown in Table 1.

EXAMPLE 7

Test was carried out in the same manner as in Example 1 except that PP-A and GPP-A were replaced by a graft polypropylene resin (GPP-B) (percentage grafting of maleic anhydride: 0.165% by weight) (80 parts by weight) prepared in the same manner as in the case of GPP-A from ethylene-propylene block copolymer (ethylene content: 6.8% by weight, MI: 8 g/10 min). The results are shown in Table 1.

EXAMPLE 8

Test was carried out in the same manner as in Example 1 except that when GPP-A was prepared in Example 1, maleic anhydride was replaced by acrylic acid and the resulting graft polypropylene resin (GPP-C) (percentage grafting of the acrylic acid ≈ 1.8% by weight) was used. The results are shown in Table 1.

COMPARATIVE EXAMPLE 2

Test was carried out in the same manner as in Example 1 except that GPP-A was replaced by GPP-D (10 parts by weight) prepared by mixing maleic anhydride (1.5 part by weight), di-t-butyl peroxide (10 parts by weight) and the crystalline polypropylene (100 parts by weight) used when GPP-A was prepared, and pelletizing the mixture by means of an extruder at 220° C., and the quantity of PP-A used was reduced down to 70 parts by weight. The results are shown in Table 1.

TABLE 1

| | Composition* | | | | | Physical properties | | | | | |
| | Polypropylene | | Graft polypropylene | | | | | | | Izod impact strength (kg · cm/cm) | | Odor and Coloring |
| | Kind | Used quantity (part by weight) | Kind | Used quantity (part by weight) | Organic peroxide (part by weight) | MI (g/10 min) | Yield strength (kg/cm²) | Flexural strength (kg/cm²) | Flexural modulus (kg/cm²) | 23° C. | −10° C. | |
|---|---|---|---|---|---|---|---|---|---|---|---|---|
| Example 1 | PP-A | 79 | GPP-A | 1 | 0.1 | 5.6 | 980 | 1250 | 44300 | 17.5 | 14.2 | None |
| Example 2 | " | 79.5 | " | 0.5 | " | 5.5 | 850 | 1120 | 42500 | 16.7 | 13.2 | " |
| Example 3 | " | 78 | " | 2 | " | 5.8 | 990 | 1270 | 45000 | 17.8 | 14.7 | " |
| Compar. ex. 1 | " | 80 | — | — | " | 5.2 | 760 | 1030 | 38000 | 13.1 | 9.5 | " |
| Example 4 | " | 79 | GPP-A | 1 | — | 0.5 | 930 | 1200 | 43800 | 19.3 | 14.8 | " |
| Example 5 | PP-B | " | " | " | 0.07 | 7.2 | 890 | 1150 | 41000 | 14.8 | 11.9 | " |
| Example 6 | PP-C | " | " | " | " | 6.1 | 1100 | 1400 | 48500 | 10.7 | 8.8 | " |
| Example 7 | — | — | GPP-B | 80 | " | 6.4 | 1000 | 1280 | 45100 | 18.1 | 14.8 | " |
| Example 8 | PP-A | 79 | GPP-C | 1 | 0.1 | 5.7 | 970 | 1210 | 43800 | 17.1 | 13.9 | " |
| Compar. ex. 2 | " | 70 | GPP-D | 10 | " | 5.9 | 850 | 1100 | 42500 | 15.2 | 11.6 | odored and colored |

*Other components: glass fibers (GF-A) (20 parts by weight), calcium stearate (0.02 part by weight), calcium hydroxide (0.03 part by weight), 2,6-di-t-butyl-4-methylphenol (0.05 part by weight), tetraxis[methylene-3-(3,5-di-t-butyl-4-hydroxyphenyl)propionate]methane (0.1 part by weight), distearylthiodipropionate (0.3 part by weight), and aluminum p-t-butylbenzoate (0.1 part by weight).

EXAMPLES 9 AND 10 AND COMPARATIVE EXAMPLES 3 AND 4

Tests were carried out in the same manner as in Example 1 except that the quantities of PP-A and GF-A used were varied to the values shown in Table 2. The results are shown in Table 2 together with those of Example 1.

fibers (GF-E) (single filament diameter: 9 μm and length: 3 mm). The results are shown in Table 2.

TABLE 2

| | Composition* | | | | Physical properties | | | | |
|---|---|---|---|---|---|---|---|---|---|
| | Quantity of PP-A used (part by weight) | Quantity of GPP-A used (part by weight) | Glass fiber | | MI (g/10 min) | Yield strength (kg/cm²) | Flexural strength (kg/cm²) | Flexural modulus (kg/cm²) | Izod impact strength (kg·cm/cm) |
| | | | Kind | Used quantity (part by weight) | | | | | 23° C.    −10° C. |
| Example 1 | 79 | 1 | GF-A | 20 | 5.6 | 980 | 1250 | 44300 | 17.5    14.2 |
| Example 9 | 89 | " | " | 10 | 5.5 | 680 | 780 | 25200 | 14.2    11.0 |
| Example 10 | 69 | " | " | 30 | 5.2 | 1060 | 1450 | 58800 | 19.5    14.0 |
| Compar. ex. 3 | 95 | " | " | 4 | 7.8 | 480 | 650 | 19500 | 8.5    6.7 |
| Compar. ex. 4** | 49 | " | " | 50 | — | — | — | — | —    — |
| Example 11 | 79 | " | GF-B | 20 | 5.7 | 1050 | 1300 | 45600 | 17.8    15.0 |
| Example 12 | " | " | GF-C | " | 5.6 | 975 | 1210 | 43800 | 17.2    13.7 |
| Example 13 | " | " | GF-D | " | 5.7 | 980 | 1190 | 43100 | 17.5    14.0 |
| Compar. ex. 5 | " | " | GF-E | " | 5.8 | 550 | 640 | 38000 | 13.3    12.6 |

*Other components: organic peroxide (0.1 part by weight), calcium stearate (0.02 part by weight), calcium hydroxide (0.03 part by weight), 2,6-di-t-butylphenol (0.05 part by weight), tetrakis[methylene-3-(3,5-di-t-butyl-4-hydroxyphenyl)propionate]methane (0.1 part by weight), distearylthiodipropionate (0.3 part by weight) and aluminum p-t-butylbenzoate (0.1 part by weight).
**Fluidity was inferior so that no good test piece could be obtained.

In addition, in the case of Comparative example 4, the fluidity was so low that no good test piece was obtained; thus the physical properties could not be measured.

EXAMPLE 11

Test was carried out in the same manner as in Example 1 except that GF-A was replaced by glass fibers (GF-B) (single fiber diameter: 6 μm and length: 3 mm) treated with γ-aminopropyltriethoxysilane. The results are shown in Table 2.

EXAMPLES 12 AND 13

Tests were carried out in the same manner as in Example 1 except that glass fibers (GF-C and GF-D) treated with N-(β-aminoethyl)-γ-aminopropyltrimethoxysilane or tetraisopropylbis(dioctylphosphite)titanate in place of γ-aminopropyltriethoxysilane were used. The results are shown in Table 2.

COMPARATIVE EXAMPLE 5

Test was carried out in the same manner as in Example 1 except that GF-A was replaced by untreated glass

EXAMPLES 14 AND COMPARATIVE EXAMPLES 6 AND 7

Tests were carried out in the same manner as in Example 1 except that the quantities of calcium stearate and calcium hydroxide were varied to those shown in Table 3. The results are shown in Table 3.

In addition, in the case where no calcium stearate was used, the dispersibility of glass fibers was inferior so that pellets and test piece having a uniform composition could not be obtained (Comparative example 6).

Further, when the quantity of calcium stearate used was too large, the strands of glass fibers fluffed out so that the surface of the resulting molded product was inferior.

EXAMPLES 15-18

Tests were carried out in the same manner as in Example 1 except that calcium hydroxide was replaced by magnesium oxide, basic magnesium carbonate, magnesium hydroxide or hydrotalcite. The results are shown in Table 3.

TABLE 3

| | Composition* | | | | | | | |
|---|---|---|---|---|---|---|---|---|
| | Calcium stearate (part by weight) | Alkaline earth metal compound (part by weight) | | MI (g/10 min) | Yield strength (kg/cm²) | Flexural strength (kg/cm²) | Flexural modulus (kg/cm²) | Izod impact strength (kg·cm/cm) |
| | | Kind | Used quantity (part by weight) | | | | | 23° C.    −10° C. |
| Example 1 | 0.02 | Calcium hydroxide | 0.03 | 5.6 | 980 | 1250 | 44300 | 17.5    14.2 |
| Compar. ex. 6** | — | Calcium hydroxide | " | — | — | — | — | —    — |
| Example 14 | 0.04 | Calcium hydroxide | 0.02 | 5.7 | 950 | 1180 | 43800 | 17.0    13.8 |
| Compar. ex. 7*** | 0.1 | Calcium hydroxide | 0.03 | 6.8 | 750 | 920 | 35000 | 13.5    8.8 |
| Example 15 | 0.02 | Magnesium oxide | " | 5.7 | 975 | 1200 | 42500 | 16.8    13.1 |
| Example 16 | " | Basic magnesium carbonate | " | 5.6 | 970 | 1210 | 42700 | 16.7    13.3 |
| Example 17 | " | Magnesium hydroxide | " | 5.6 | 970 | 1230 | 44200 | 17.0    13.8 |

TABLE 3-continued

| | Composition* | | | | | | | |
|---|---|---|---|---|---|---|---|---|
| | | Alkaline earth metal compound (part by weight) | | | | | | Izod impact strength (kg · cm/cm) |
| | Calcium stearate (part by weight) | Kind | Used quantity (part by weight) | MI (g/10 min) | Yield strength (kg/cm²) | Flexural strength (kg/cm²) | Flexural modulus (kg/cm²) | 23° C.    −10° C. |
| Example 18 | " | Hydrotalcite | " | 5.7 | 970 | 1240 | 44300 | 17.5    14.0 |

*Other components: PP-A (79 parts by weight), GPP-A (one part by weight), GF-A (20 parts by weight), organic peroxide (0.1 part by weight), 2,6-di-t-butylphenol (0.05 part by weight), tetraxis[methylene-3-(3,5-di-t-butyl-4-hydroxyphenyl)propionate]methane (0.1 part by weight), distearylthiodipropionate (0.3 part by weight), and aluminum p-t-butylbenzoate (0.1 part by weight).
**Dispersibility of glass fibers was inferior.
***Glass fibers fluffed out so that the surface was inferior.

What we claim is:

1. A glass-fiber reinforced polypropylene resin composition comprising 95 to 55 parts by weight of a modified polypropylene resin as a graft polypropylene resin obtained by graft-polymerizing a radically polymerizable unsaturated compound onto a crystalline polypropylene resin with an organic peroxide catalyst in a hydrocarbon solvent, or a blend of said graft polypropylene resin with a crystalline polypropylene resin, and 5 to 45 parts by weight of glass fibers treated with an organic silane compound or an organic titanium compound, the total weight of said modified polypropylene resin and said glass fibers being 100 parts by weight, and further 0.005 to 0.05 part by weight of calcium stearate and 0.01 to 0.07 part by weight of at least one member selected from the group consisting of alkaline earth metal oxides, hydroxides, basic salts and basic complex salts.

2. A glass-fiber reinforced polypropylene resin composition according to claim 1 wherein the quantity of said radically polymerizable unsaturated compound is in the range of 0.005 to 3.0 parts by weight based on 100 parts by weight of said glass fibers in said glass-fiber reinforced polypropylene resin composition.

3. A glass-fiber reinforced polypropylene resin composition according to claim 1 wherein the quantity of said radically polymerizable unsaturated compound is in the range of 0.05 to 2.0 parts by weight based on 100 parts by weight of said glass fibers in said glass-fiber reinforced polypropylene resin composition.

4. A glass-fiber reinforced polypropylene resin composition according to claim 1 wherein said graft polypropylene resin is obtained by graft-polymerizing 0.01 to 100 parts by weight of said radically polymerizable unsaturated compound onto 100 parts by weight of said crystalline polypropylene resin.

5. A glass-fiber reinforced polypropylene resin composition according to claim 1 wherein said crystalline polypropylene resin is propylene homopolymer and/or a copolymer of propylene with an α-olefin.

6. A glass-fiber reinforced polypropylene resin composition according to claim 1 wherein said radically polymerizable unsaturated compound is at least one member selected from the group consisting of α,β-unsaturated aliphatic monocarboxylic acids and derivatives thereof, α,β-unsaturated dicarboxylic acids and derivatives thereof, alkenylbenzenes and derivatives thereof, alkenyl pyridines and derivatives thereof and α-olefins.

7. A glass-fiber reinforced polypropylene resin composition according to claim 1 wherein said radically polymerizable unsaturated compound is maleic anhydride or acrylic acid.

8. A glass-fiber reinforced polypropylene resin composition according to claim 1 wherein said organic silane compound is at least one member selected from the group consisting of vinyltrichlorosilane, vinyltris(β-methoxyethoxy)silane, vinyltriethoxysilane, γ-methacryloxypropyltrimethoxysilane, β-(3,4-epoxycyclohexyl)ethyltrimethoxysilane, γ-glycidoxypropyltrimethoxysilane, N-(β-aminoethyl)-γ-aminopropyltrimethoxysilane, N-(β-aminoethyl)-γ-aminopropylmethyldimethoxysilane, γ-aminopropyltriethoxysilane, N-phenyl-γ-aminopropyltrimethoxysilane, γ-methylcaptopropyltrimethoxysilane and γ-chloropropyltrimethoxysilane.

9. A glass-fiber reinforced polypropylene resin composition according to claim 1 wherein said organic silane compound is γ-aminopropyltriethoxysilane and/or N-(β-aminoethyl)-γ-aminopropyltrimethoxysilane.

10. A glass-fiber reinforced polypropylene resin composition according to claim 1 wherein said organic titan compound is tetraisopropylbis(dioctylphosphite)titanate.

11. A glass-fiber reinforced polypropylene resin composition according to claim 1 wherein said glass fibers have a single fiber diameter of 1 to 15 μm and a length of 1 to 10 mm.

12. A glass-fiber reinforced polypropylene resin composition according to claim 1 containing 95 to 60 parts by weight of said modified polypropylene resin and 5 to 40 parts by weight of said glass fibers, the total weight of said modified polypropylene resin and said glass fibers being 100 parts by weight.

13. A glass-fiber reinforced polypropylene resin composition according to claim 1 wherein the quantity of said calcium stearate is in the range of 0.01 to 0.05 part by weight based on 100 parts by weight as the total weight of said modified polypropylene resin and said glass fibers.

14. A glass-fiber reinforced polypropylene resin composition according to claim 1 wherein said alkaline earth metal oxides, hydroxides, basic salts and basic complex salts are at least one member selected from the group consisting of magnesium oxide, magnesium hydroxide, calcium oxide, calcium hydroxide, hydrotalcite group and basic magnesium carbonate.

15. A glass-fiber reinforced polypropylene resin composition according to claim 1, subjected to heat treatment in the presence of an organic peroxide.

16. A glass-fiber reinforced polypropylene resin composition according to claim 15 wherein the quantity of said organic peroxide is in the range of 0.001 to 0.5 part by weight based on 100 parts by weight as the total weight of said modified polypropylene resin and said glass fibers.

17. A glass-fiber reinforced polypropylene resin composition according to claim 15 wherein the temperature of said heat treatment is in the range of 170° to 280° C.

* * * * *